United States Patent [19]

Peot et al.

[11] Patent Number: 5,489,485
[45] Date of Patent: Feb. 6, 1996

[54] BATTERY REMOVAL AND REPLACEMENT SYSTEM

[75] Inventors: David G. Peot, Easley; Daniel A. Chunn, Greenville, both of S.C.

[73] Assignee: Ryobi Motor Products Corporation, Easley, S.C.

[21] Appl. No.: 169,318

[22] Filed: Dec. 17, 1993

[51] Int. Cl.$^6$ .................................................. H01M 2/34
[52] U.S. Cl. ........................... 429/99; 429/65; 429/100; 429/159
[58] Field of Search ........................... 429/65, 99, 10, 429/156, 157, 159, 170

[56] References Cited

U.S. PATENT DOCUMENTS

| | | | |
|---|---|---|---|
| 3,042,734 | 7/1962 | Carmichael et al. | 429/170 X |
| 3,186,878 | 6/1965 | Filander . | |
| 3,194,688 | 7/1965 | Riley et al. . | |
| 3,684,583 | 8/1972 | Lehnen et al. | 429/100 |
| 3,736,189 | 5/1973 | Ciliberti | 429/157 |
| 3,948,683 | 4/1976 | Garcin | 429/65 X |
| 3,990,919 | 11/1976 | Krueger | 429/100 |
| 3,999,110 | 12/1976 | Ramstrom et al. | 429/96 X |
| 4,206,274 | 6/1980 | Peels | 429/99 |
| 4,265,984 | 5/1981 | Kaye | 429/178 |
| 4,447,749 | 5/1984 | Reeb, Jr. et al. | 310/71 |
| 4,489,268 | 12/1984 | Beachy | 429/157 X |
| 4,751,452 | 6/1988 | Kilmer et al. | 320/2 |
| 4,871,629 | 10/1989 | Bunyea | 429/97 |
| 4,873,160 | 10/1989 | Miyazaki et al. | 429/100 X |
| 4,945,790 | 8/1990 | Golden | 81/57.14 |
| 5,054,563 | 10/1991 | Zapf | 173/163 |
| 5,079,108 | 1/1992 | Annen et al. | 429/170 X |
| 5,213,913 | 5/1993 | Anthony, III et al. | 429/97 |
| 5,348,815 | 9/1994 | Barker | 429/65 |

*Primary Examiner*—Stephen Kalafut
*Attorney, Agent, or Firm*—Brooks & Kushman

[57] ABSTRACT

A battery housing for a combination of cells which prevents inadvertent short circuiting caused by electrical contact with discarded battery assemblies. An embodiment of the battery housing comprises a conductive connector, electrically connected to the positive battery terminal, for electrically connecting to a mating contact within an appliance. A terminal insulator insulates the conductive connector from electrical contact with a second battery housing. A sleeve, comprising a length of heat-shrinkable tubing, secures the positioning of the combination of cells and the terminal insulator. A non-conductive cap insulates the conductive connector of a battery assembly removed from the appliance from any external electrical contact. An optional orientation slot is included on the terminal insulator to match with a rib incorporated within the appliance to guide a slip-in fit of the battery assembly within the appliance.

8 Claims, 1 Drawing Sheet

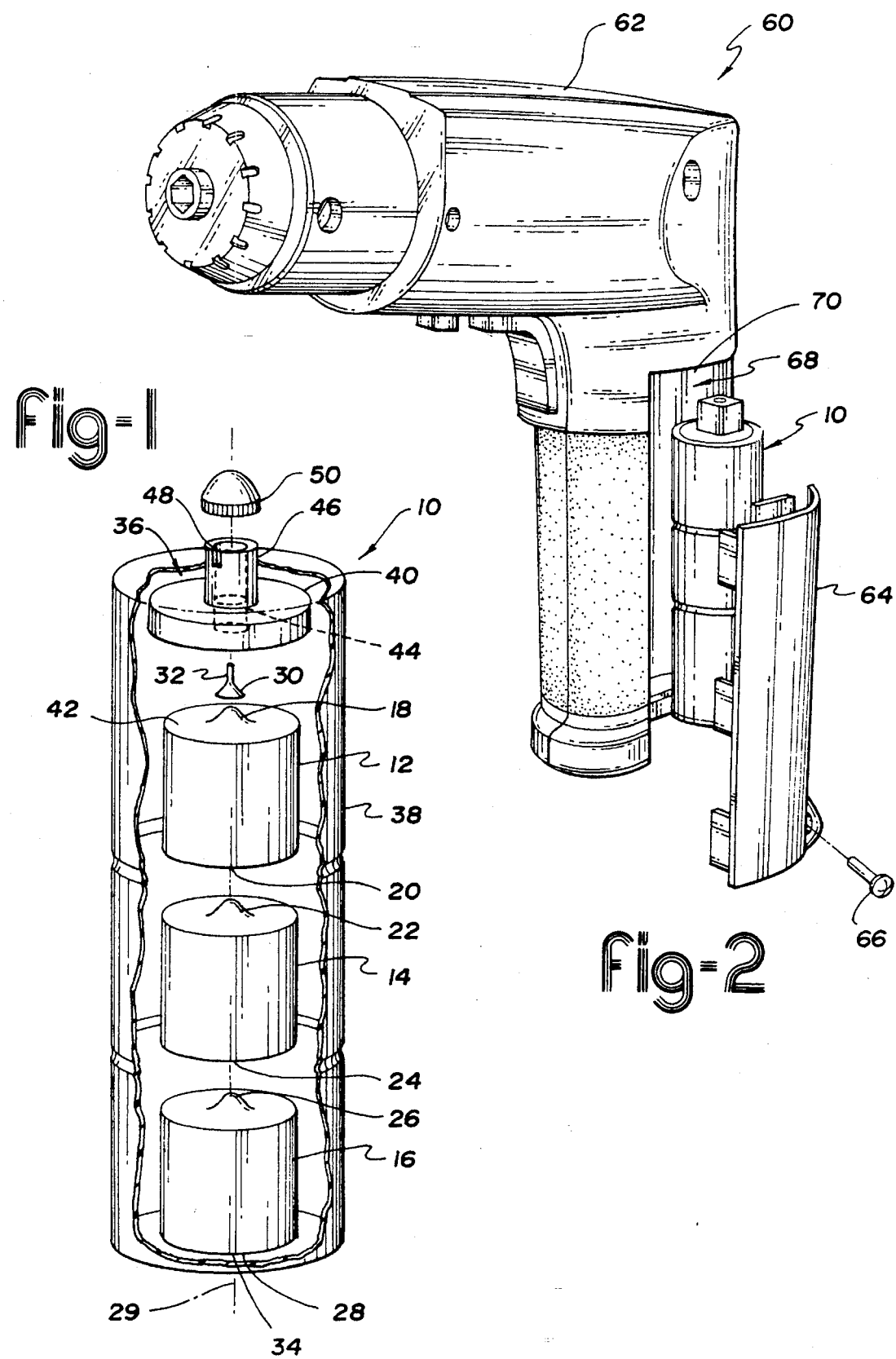

BATTERY REMOVAL AND REPLACEMENT SYSTEM

TECHNICAL FIELD

This invention relates to battery housing assemblies, and more particularly, to removable battery housing assemblies.

BACKGROUND ART

A series or parallel combination of individual cells, known as a battery, is used to provide a portable means for powering various stored energy appliances. A stored energy appliance is preferred over an alternating current supplied appliance when the location of the appliance changes frequently during operation, when handling of the appliance is hampered by a power cord, or when a source of alternating current is not available. A prime example of a stored energy appliance being preferred over an alternating current appliance is in the use of handheld power tools. Cordless handheld power tools are usually employed to repeatedly perform similar tasks over various locations, with the tasks being easier to perform without the presence of a power cord. Such cordless handheld power tools include handheld power drills, wire wrapping tools, and in-line and pistol grip power screwdrivers.

Many cordless power tools include the capacity therewithin for accommodating a battery assembly, the battery assembly comprising the series or parallel combination of cells contained within a battery housing. The battery assembly can be synonymously referred to as a battery pack or a power pack. Electrical contact is provided between terminals of the battery housing and corresponding powering contacts of the cordless power tool. The battery assembly is designed to be an entity separate from the cordless power tool so as to facilitate ease in both the removal and replacement of cells. Hence, when the cells in a battery assembly become discharged resulting from use of the power tool, or when the cells have lost their ability to retain a sufficient charge due to age, the entire discharged battery assembly can be removed and a new battery assembly containing either recharged cells or new cells can be inserted.

For the purpose of environmental protection, some retailers of appliances using battery assemblies are accepting aged or defective battery assemblies used in appliances which they retail, for either recycling or disposal. The consumer typically returns his/her old battery assembly when he/she purchases a new battery assembly. Employees of the retailer responsible for the exchange dispose the old battery assembly into a storage container. At a later time, the cells from within the battery assemblies in the storage container are removed for proper disposal or recycling.

Although each of the battery assemblies within the storage container may be either incapable of sufficiently powering the tool or altogether defective, generally, each is still sufficiently energized to generate a flow of electrical current if a conductive path is provided between the positive and negative terminals. Specifically, a significantly-high current flow can result when a cell with low internal impedance is externally shorted. The heat produced by such a high current can cause severe burns if contact is made with a person's skin. Further hazards resulting from the heat include the risk of explosion of the cells and the potential of fire. Therefore, care must be taken to prevent shorting of the terminals of the removed battery assemblies within the storage container.

A second common scenario in which a collection of battery assemblies is stored in a container results from the power demands of cordless power tools relative to the power storage capabilities of the cells. In order to complete a large-scale tooling job with a cordless power tool, many successive replacements of a discharged battery assembly with a charged battery assembly may be necessary. For example, a cordless power drill equipped with nickel-cadmium cells will run low on energy after a matter of minutes of application. The same applies for garden tools such as lawn mowers and hedge shears. An alternative to a procedure of repeatedly charging the cells in the discharged battery assembly (using a one-hour fast charger, for example) followed by performing a subset of the tooling tasks is to have a plurality of charged battery assemblies present to allow the completion of tooling tasks with minimal offtime. The depleted battery assemblies would then be discarded into a storage container to provide collection for recharging of the cells thereafter. An additional concern with regard to short circuiting the terminals in this scenario is the possibility of causing permanent damage to the cells by the act of forcible discharge. This is especially true for cells containing a light metal anode, such as lithium.

U.S. Pat. No. 4,265,984 to Kaye discloses a two-piece battery housing comprising two terminals located at the same end of the housing. One of the housing terminals, electrically connected to a terminal of the battery, is recessed within the housing, while the other of the housing terminals, electrically connected to the other terminal of the battery, protrudes from the battery housing concentric with and spaced from the first terminal. Although this configuration of the terminals prevents inadvertent short circuiting of the batteries if stored in bulk, short circuiting can easily occur if a stray conductive object, such as a screw or a nut, contacts the assembly so as to provide a conductive path between the two terminals.

SUMMARY OF THE INVENTION

The need exists for a battery housing which prevents battery assemblies discarded in a storage container from inadvertently short circuiting, and further allows for prompt removal of the cells therewithin for proper disposal or recycling.

Accordingly, an object of the present invention is to provide a battery housing which prevents inadvertent short circuiting caused by electrical contact of terminals.

In carrying out the above object, the present invention provides a battery housing for containing a battery having a positive battery terminal and a negative battery terminal, the battery comprised of a series combination of at least one cell. The battery housing comprises a conductive connector, electrically connected to the positive battery terminal, for electrically connecting to a mating contact within an appliance. The housing further comprises terminal insulating means for insulating the conductive connector from electrical contact with a second battery housing and sleeve means for securing the positioning of the series combination of at least one cell and the terminal insulating means.

These and other features, aspects, and advantages of the present invention will become better understood with regard to the following description, appended claims, and accompanying drawings.

BRIEF DESCRIPTION OF THE DRAWINGS

FIG. 1 is an exploded view of an embodiment of the battery assembly; and

FIG. 2 shows the use of an embodiment of the battery assembly within a cordless pistol-grip power screwdriver.

DETAILED DESCRIPTION OF THE INVENTION

FIG. 1 shows an exploded view of an embodiment of a battery assembly 10. In general, the battery assembly 10 comprises a battery consisting of at least one cell electrically connected in series. For the purpose of illustration, the assembly comprises three cells: a head cell 12, a middle cell 14, and a tail cell 16. Each of the three cells has a corresponding positive cell terminal and a corresponding negative cell terminal located at opposite ends of the cell. The head cell 12 has a positive cell terminal 18 and a negative cell terminal 20, the cell 14 has a positive cell terminal 22 and a negative cell terminal 24, and the tail cell has a positive cell terminal 26 and a negative cell terminal 28. The three cells 12, 14, and 16 are electrically connected in series; in other words, the negative cell terminal 20 of the head cell 12 is electrically connected to the positive cell terminal 22 of the middle cell 14, and the negative cell terminal 24 of the middle cell 14 is electrically connected to the positive cell terminal 26 of the tail cell 16. Physically, the cells 12, 14, and 16 lie along a common assembly axis 29. The cell terminals are interconnected using means such as conventional welded tabs.

A suitable conductive connector, such as a conductive male connector 30, is fastened to the positive cell terminal 26. The connector 30 is preferably welded to the positive cell terminal 26, although alternative embodiments can employ a connector capable of being fastened without welding. The connector 30 is positioned to lie along the common assembly axis 29. The series combination of the three cells 12, 14, and 16 and the male connector 30 forms the battery having a positive battery terminal 32 at the male connector 30, and a negative battery terminal 34 located at the negative cell terminal 28 of the tail cell 16.

The housing of the battery assembly 10 comprises a terminal insulator 36 and a sleeve 38. The terminal insulator 36 comprises a non-conductive laminar-shaped base 40 having a form substantially similar to the form of the face 42 of the head cell. For the embodiment of FIG. 1 wherein the illustrated cells 12, 14, and 16 are circularly cylindrical, the base 40 is a circular disc having a diameter substantially equal to the diameter of the face 42 of the head cell 12. One skilled in the art will recognize that a rectangular-shaped base can be employed for rectangularly-cylindrical-shaped cells. The base includes an opening 44 for allowing the male connector 30 to project therethrough so that the base 40 can rest flush against the face 42 of the head cell 12.

The terminal insulator 36 further comprises a non-conductive cylindrical extension 46 encircling the opening 44 of the base 40 radially about the assembly axis 29. The cylindrical extension 46 has an opening 48 to accommodate the male connector 30 projecting through the base 40, and to allow access to the connector 30 by a mating terminal within an appliance (not shown). The cylindrical extension 46 is shaped to sufficiently surround the connector 30 so that a conductive element of another battery assembly having a similar design cannot come in electrical contact with the connector 30. An optional orientation slot 48 is included on the extension 46 to correspond with a matching rib incorporated within the appliance (not shown) to guide a slip-in fit of the battery assembly 10 within the appliance.

In order to further prevent short circuiting of the battery assembly 10 when stored in bulk with other battery assemblies having designs that include protruding battery terminals and wires, a non-conductive cap 50 having an inner diameter matching the outer diameter of the extension 46, and having a suitable length to fully enclose the connector 30, can be placed over the extension before placing the assembly in a storage container. To avoid requiring the use of a custom non-conductive cap 50, the outer diameter of the extension can be designed to match the inner diameter of a commercially-available cap, such as a plastic thread protector. This would be beneficial to users needing to replace a misplaced or lost cap 50. One skilled in the art will recognize that a non-conductive plug, or the like, which fits within the inner diameter of the extension for the purpose of insulating the connector 30 can be substituted for the cap 50.

The sleeve 38 is used to secure the combination of cells 12, 14, and 16, and the terminal insulator 36. The sleeve 38 consists of a length of heat-shrinkable tubing having a pre-shrunk diameter greater than the diameter of the base 40 and the diameter of the cells. The heat-shrinkable tubing of suitable diameter is positioned to radially surround the cells and the terminal insulator about the assembly axis 29. The length and positioning of the tubing along the assembly axis 29 is such that when heat shrunk onto the combination of cells and the terminal insulator, it laps over the base 40 of the terminal insulator 36 and extends over a portion of the tail cell 16. In the embodiment of FIG. 1, the tubing extends to cover approximately two thirds of the tail cell 16. The heat-shrunk sleeve 38 embraces the combination to maintain the positioning of the terminal insulator 36, and to constrain the entire combination to lie substantially along the common assembly axis 29. The use of heat-shrinkable tubing for the sleeve 38 allows ease in stripping the cells from the battery assembly for recycling.

FIG. 2 shows the use of the battery assembly 10 within a cordless pistol-grip power screwdriver 60. The cordless power screwdriver 60 comprises a power screwdriver apparatus 62, a battery cover 64, and a battery cover screw 66. The battery cover screw 66 is used to fasten the battery cover 64 to the power screwdriver apparatus 62. The power screwdriver apparatus 62 contains a housing 68 which is accessible upon removal of the battery cover 64. The housing 68 is shaped to allow for a slip-in fit of the battery assembly 10. The slip-in fit of the assembly 10 initiates contact between the connector 30 and a mating terminal 70 within the housing 68. The negative battery terminal 34 electrically connects to the power screwdriver apparatus 62 by either a saddle clamp (not shown) if the battery assembly 10 is to be inserted radially about the assembly axis 29, or an end cap connector (not shown) if the battery assembly 10 is to be inserted axially about the assembly axis 29. After the battery assembly 10 is inserted into the housing 70, the battery cover 64 is secured to the power screwdriver apparatus 62 by the battery cover screw 66 to enclose the housing 70.

The previously described embodiments of the present invention have many advantages, including the ability to prevent discarded battery assemblies from shorting out when stored in bulk. Another advantage is that a customer can access the battery assembly within an appliance by removing only one screw. This allows for quick and easy removal of an aged or discharged battery assembly. Moreover, the installation of a new battery assembly is as simple as the removal of the old battery assembly. A further advantage is that discarded battery assemblies can be disassembled to bare the cells therewithin by simply stripping the heat-shrink tubing sleeve. This process, which would expend less than 30 seconds of time for each battery assembly, aids in reducing the cost of disposal and recycling after collection of the old battery assemblies.

While the best mode for carrying out the invention has been described in detail, those familiar with the art to which this invention relates will recognize various alternative designs and embodiments for practicing the invention as defined by the following claims.

What is claimed is:

1. A battery assembly comprising:

a battery, the battery comprising at least one cell, the battery having a positive battery terminal and a negative battery terminal;

an elongated connector, electrically connected to one of said positive and negative battery terminals, for electrically connecting to a contact within an appliance, said elongated connector aligned along an axis and having an axial length;

a terminal insulator formed of a non conductive material comprising a substantially cylindrical extension having an opening within which the elongated connector is generally coaxially located and a base having an opening for allowing the elongated connector to project therethrough into the extension opening said terminal insulator having an axial length which exceeds the axial length of the elongated connector so that the elongated connector can not come into contact with an electrical terminal of like constructed battery assembly when placed in a recycling bin; and a sleeve of heat-shrinkable tubing for securing the positioning without adhesive bonding of the series combination of at least one cell and the terminal insulator wherein the sleeve of a discarded battery assembly can be easily cut and stripped facilitating the removal of at least one cell for recycling purposes.

2. The battery assembly of claim 1 wherein the first battery terminal is a positive battery terminal.

3. The battery assembly of claim 1 wherein the first battery terminal is a negative battery terminal.

4. The battery assembly of claim 1 further comprising:

a removable cap attachable to the terminal insulator for insulating the elongated connector from any external electical contact.

5. The battery assembly of claim 1 wherein the terminal insulator further is provided with an orientation slot.

6. The battery assembly of claim 1 wherein the elongated connector comprises a male conductor.

7. The battery assembly of claim 6 wherein the male conductor is cylindrical.

8. The battery assembly of claim 1 wherein said at least one cell comprises a plurality of identical cells arranged in series.

\* \* \* \* \*